(12) United States Patent
Omori et al.

(10) Patent No.: US 11,849,221 B2
(45) Date of Patent: Dec. 19, 2023

(54) APPARATUS, METHOD, AND STORAGE MEDIUM

(71) Applicant: CANON KABUSHIKI KAISHA, Tokyo (JP)

(72) Inventors: Hirotaka Omori, Tokyo (JP); Toshiyuki Dobashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/459,809

(22) Filed: Aug. 27, 2021

(65) Prior Publication Data
US 2022/0078323 A1 Mar. 10, 2022

(30) Foreign Application Priority Data
Sep. 4, 2020 (JP) .................................. 2020-149010

(51) Int. Cl.
*H04N 23/71* (2023.01)
*H04N 23/72* (2023.01)

(52) U.S. Cl.
CPC ............. *H04N 23/71* (2023.01); *H04N 23/72* (2023.01)

(58) Field of Classification Search
CPC .... H04N 5/2351; H04N 5/2352; H04N 5/232; H04N 5/23219; H04N 5/2353; H04N 9/04551; H04N 5/2355; H04N 5/2253; H04N 5/2254; H04N 5/355; H04N 5/372; H04N 5/374; H04N 23/71; H04N 23/72; H04N 23/60; H04N 23/611; H04N 23/73; H04N 25/13; H04N 23/54; H04N 23/55; H04N 23/741; H04N 25/57; H04N 25/71; H04N 25/76; G03B 7/097; G03B 7/28; G06V 40/103; G06V 40/161
See application file for complete search history.

(56) References Cited

U.S. PATENT DOCUMENTS

| 9,449,376 | B2 | 9/2016 | Kimura | |
|---|---|---|---|---|
| 2007/0147701 | A1* | 6/2007 | Tanaka | H04N 5/23219 348/E5.038 |
| 2009/0059033 | A1* | 3/2009 | Shimada | G03B 7/093 348/229.1 |
| 2012/0307107 | A1* | 12/2012 | Brunner | H04N 23/71 348/E5.037 |

(Continued)

FOREIGN PATENT DOCUMENTS

JP 2015130615 A 7/2015

*Primary Examiner* — Jason A Flohre
(74) *Attorney, Agent, or Firm* — CANON U.S.A., INC. IP Division

(57) ABSTRACT

An apparatus includes an acquisition unit configured to acquire an image, a first detection unit configured to detect a first region corresponding to a first feature from the image, a second detection unit configured to detect a second region corresponding to a second feature from the image, a measurement unit configured to perform photometric measurement on the first region and the second region, a determination unit configured to determine an exposure based on a weighted average of a first photometric value of the first region that is acquired by the measurement unit and a second photometric value of the second region that is acquired by the measurement unit before the first photometric value is acquired, and an output unit configured to output information about the exposure.

20 Claims, 11 Drawing Sheets

(56) References Cited

U.S. PATENT DOCUMENTS

| | | | |
|---|---|---|---|
| 2013/0265482 A1* | 10/2013 | Funamoto | H04N 5/23219 348/349 |
| 2013/0307993 A1* | 11/2013 | Kawarada | H04N 5/232945 348/169 |
| 2014/0168479 A1* | 6/2014 | Ishii | H04N 5/23219 348/241 |
| 2014/0176784 A1* | 6/2014 | Hongu | H04N 5/232123 348/349 |
| 2014/0376813 A1* | 12/2014 | Hongu | H04N 23/611 382/118 |
| 2016/0173759 A1* | 6/2016 | Nakamura | H04N 5/232127 348/222.1 |
| 2017/0272661 A1* | 9/2017 | Tsubusaki | H04N 5/232123 |
| 2018/0234610 A1* | 8/2018 | Nakamura | H04N 23/73 |
| 2020/0059605 A1* | 2/2020 | Liu | H04N 5/232939 |
| 2020/0137281 A1 | 4/2020 | Omori | |

\* cited by examiner

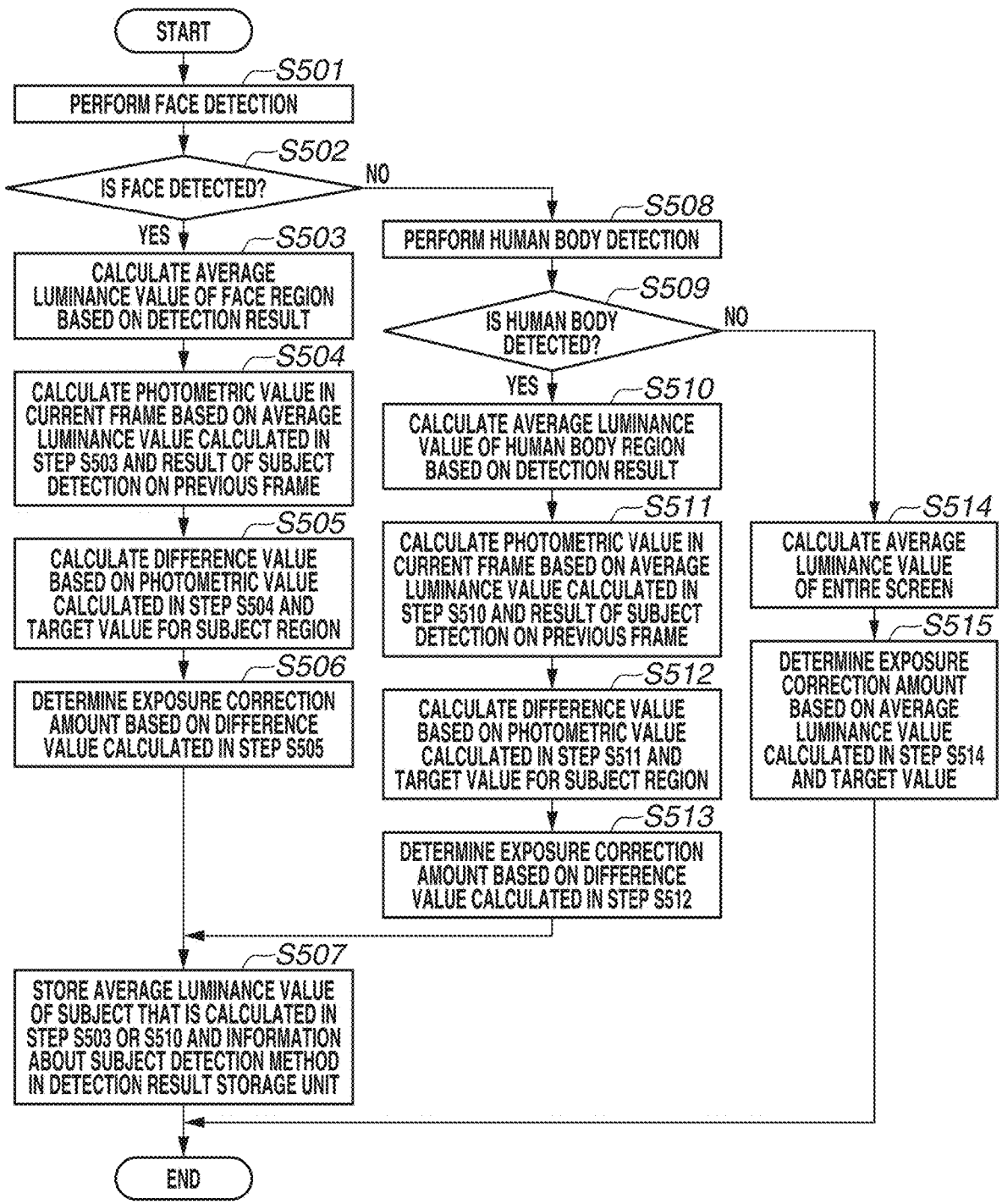

AVERAGE LUMINANCE VALUE OF SUBJECT
ACCORDING TO CONVENTIONAL METHOD

AVERAGE LUMINANCE VALUE OF SUBJECT
ACCORDING TO PROPOSED METHOD

DIFFERENCE VALUE ACCORDING TO CONVENTIONAL METHOD

ROBUST AGAINST MISDETECTION AND CHANGE OF DETECTION UNIT

DIFFERENCE VALUE ACCORDING TO PROPOSED METHOD

PROPOSED METHOD
NOT CONSIDERING DETECTION SCORE

PROPOSED METHOD
CONSIDERING DETECTION SCORE

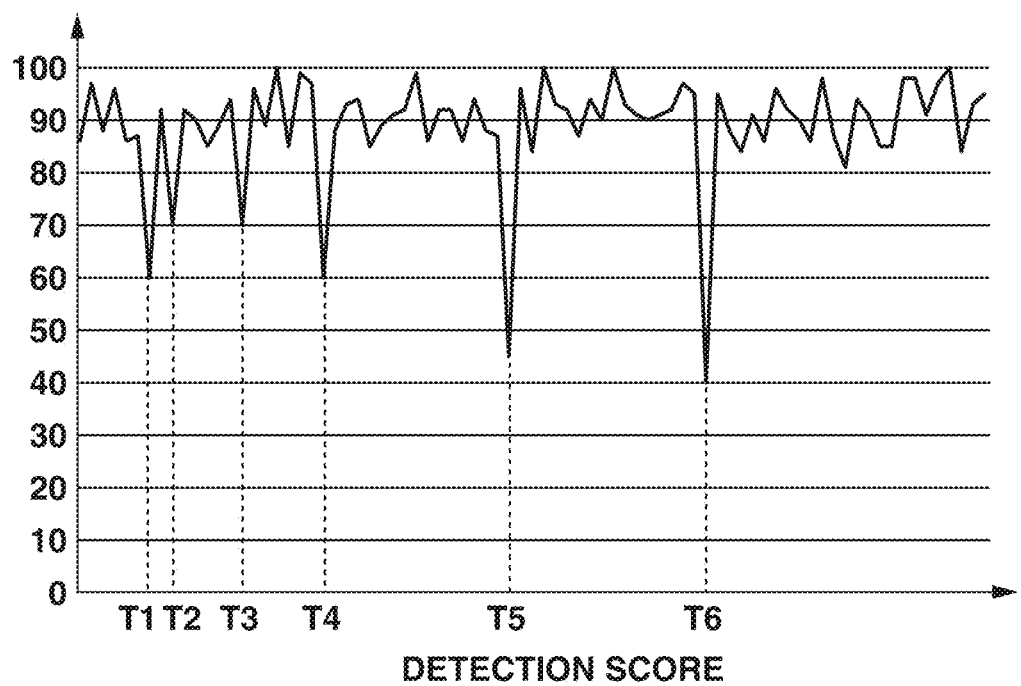
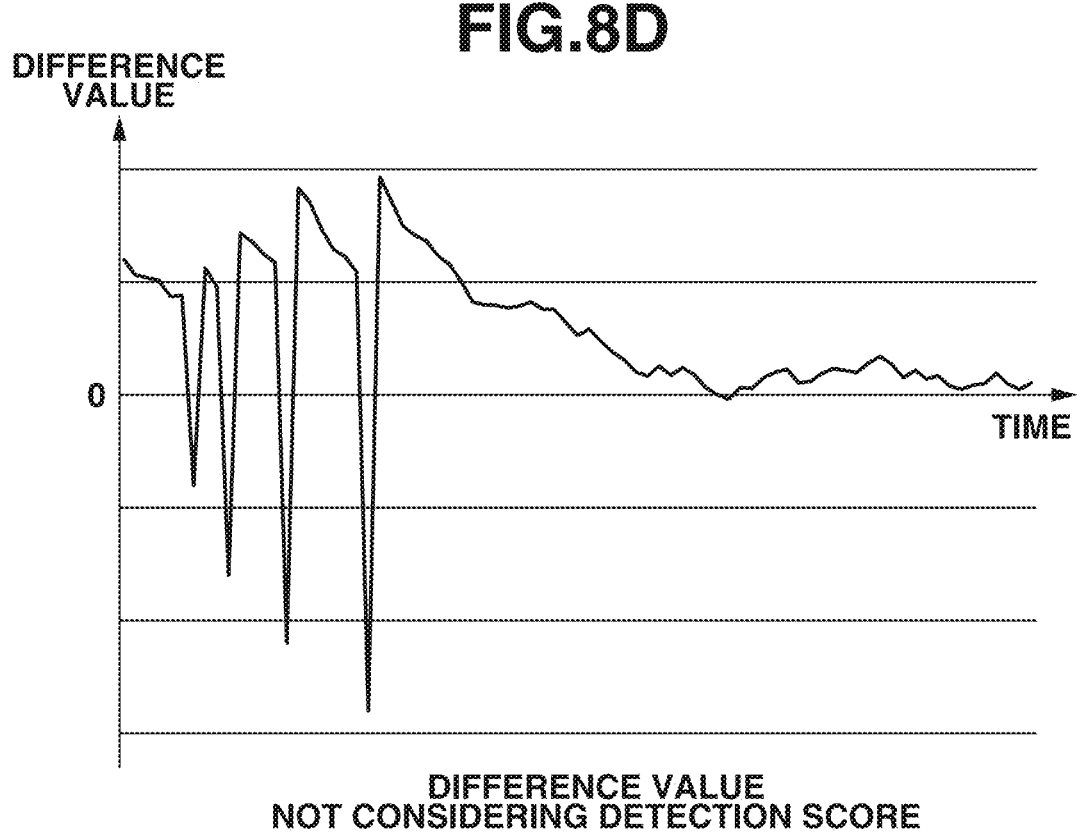

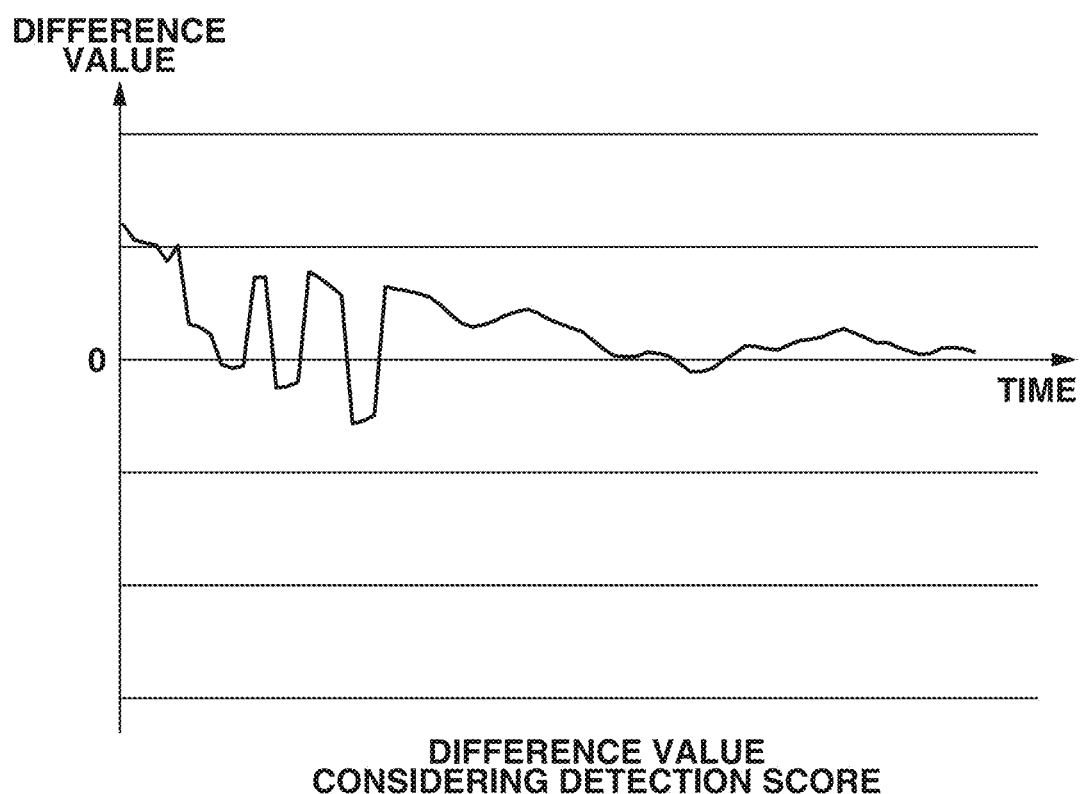

APPARATUS, METHOD, AND STORAGE MEDIUM

BACKGROUND

Field of the Disclosure

The aspect of the embodiments relates to an apparatus, a method, and a storage medium.

Description of the Related Art

Conventionally, a technique for determining an exposure amount using not only face detection but also human body detection in a backlight environment has been known, as discussed in Japanese Patent Application Laid-Open No. 2015-130615.

SUMMARY

According to an aspect of the embodiments, an apparatus includes an acquisition unit configured to acquire an image, a first detection unit configured to detect a first region corresponding to a first feature from the image, a second detection unit configured to detect a second region corresponding to a second feature from the image, a measurement unit configured to perform photometric measurement on the first region and the second region, a determination unit configured to determine an exposure based on a weighted average of a first photometric value of the first region that is acquired by the measurement unit and a second photometric value of the second region that is acquired by the measurement unit before the first photometric value is acquired, and an output unit configured to output information about the exposure.

Further features of the present disclosure will become apparent from the following description of exemplary embodiments with reference to the attached drawings.

BRIEF DESCRIPTION OF THE DRAWINGS

FIG. 5 is a flowchart illustrating an example of detection processing and an example of exposure determination processing according to the first exemplary embodiment.

FIGS. 8A to 8E are diagrams illustrating a relationship between an average luminance value of a subject, a detection score, and a difference value according to a modified example of the first exemplary embodiment.

DESCRIPTION OF THE EMBODIMENTS

Figure 1:
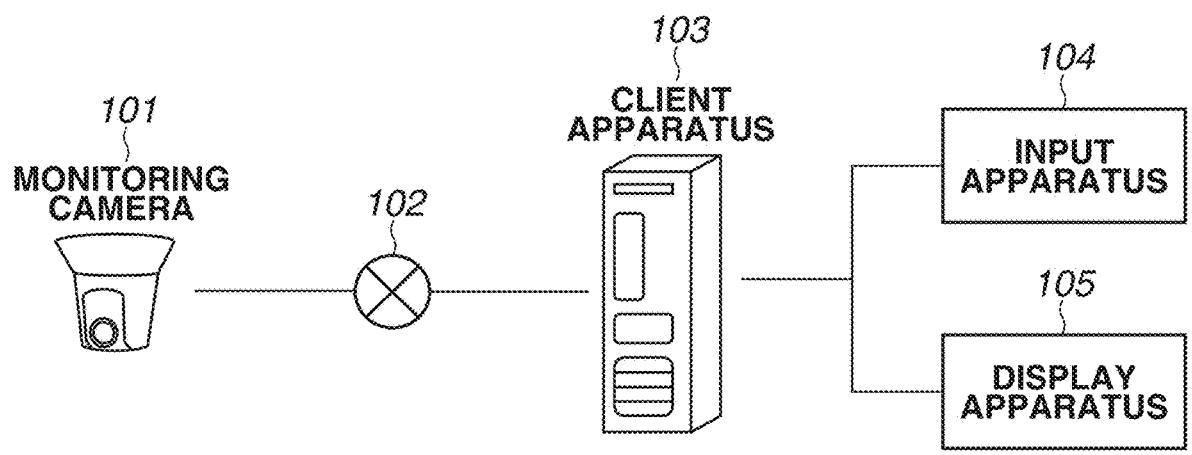
FIG. 1 is a block diagram illustrating an example of a configuration of an imaging control system according to a first exemplary embodiment of the present disclosure.

An information processing apparatus according to a first exemplary embodiment will be described below with reference to FIGS. 1 to 7D. One or more of functional blocks illustrated in the drawings to be described below may be implemented by hardware, such as an application-specific integrated circuit (ASIC) or a programmable logic array (PLA), or may be implemented by a programmable processor, such as a central processing unit (CPU) or a microprocessing unit (MPU), that executes software. Alternatively, one or more of the functional blocks may be implemented by a combination of software and hardware. Thus, even in a case where different functional blocks are described below as actors of operations, the same hardware may be implemented as the actors.

<Basic Configuration>

FIG. 1 is a block diagram illustrating an example of a configuration of an imaging control system (or an imaging system) according to the present exemplary embodiment. The imaging control system illustrated in FIG. 1 includes a monitoring camera 101, a network 102, a client apparatus 103, an input apparatus 104, and a display apparatus 105. The monitoring camera 101 is capable of performing subject image capturing to acquire moving images and performing image processing. The monitoring camera 101 and the client apparatus 103 are communicably connected to each other via the network 102.

Figure 2:
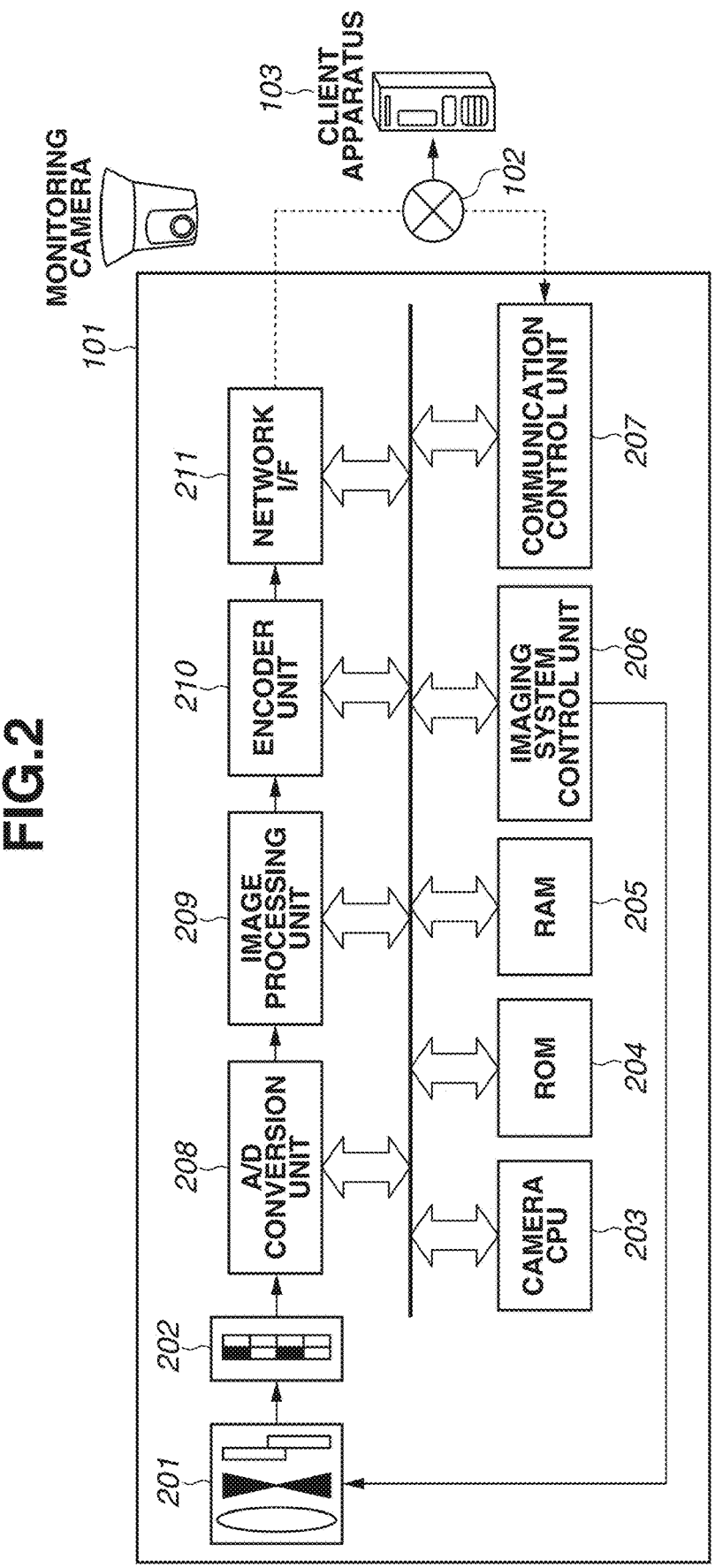
FIG. 2 is a block diagram illustrating an example of an internal configuration of a monitoring camera according to the first exemplary embodiment.

FIG. 2 is a block diagram illustrating an example of an internal configuration of the monitoring camera 101 according to the present exemplary embodiment. An imaging optical system 201 is an optical member group that includes a zoom lens, a focus lens, a blur correction lens, a diaphragm, and a shutter, and that collects optical information about a subject.

An image sensor 202 is a charge accumulation type solid-state image sensor, such as a complementary metal oxide semiconductor (CMOS) image sensor or a charge-coupled device (CCD) image sensor, that converts a light flux collected by the imaging optical system 201 into an electric current value (a signal value), and serves as an imaging unit that acquires color information when used in combination with a color filter.

A camera CPU 203 is a control unit that comprehensively controls operations of the monitoring camera 101. The camera CPU 203 reads an instruction stored in a read only memory (ROM) 204 or a random access memory (RAM) 205, and performs processing based on the instruction. An imaging system control unit 206 controls the components of the monitoring camera 101 to perform focus control, shutter control, diaphragm adjustment, or the like for the imaging optical system 201 (based on an instruction from the camera CPU 203). A communication control unit 207 communicates with the client apparatus 103 to perform control for transmitting control instructions about the components of the monitoring camera 101 to the camera CPU 203.

An analog-to-digital (A/D) conversion unit 208 converts the amount of subject light detected by the image sensor 202 into a digital signal value. An image processing unit 209 performs image processing on image data that is output as a digital signal from the image sensor 202. An encoder unit 210 is a conversion unit that converts image data processed by the image processing unit 209 into a file format such as Motion Joint Photographic Experts Group (Motion JPEG), H.264, or H.265. A network interface (I/F) 211 is used to communicate with an external apparatus such as the client apparatus 103 via the network 102, and is controlled by the communication control unit 207.

The network 102 is an Internet Protocol (IP) network that connects the monitoring camera 101 and the client apparatus 103 to each other. The network 102 includes, for example, a plurality of routers, switches, and cables that meets the Ethernet® communication standards. In the present exemplary embodiment, the network 102 may be any network via which the monitoring camera 101 and the client apparatus 103 can communicate with each other, and communication standards, scale, and configuration of the network 102 are not particularly limited. For example, the network 102 may include the Internet, a wired local area network (wired LAN), a wireless LAN, and/or a wide area network (WAN).

Figure 3:
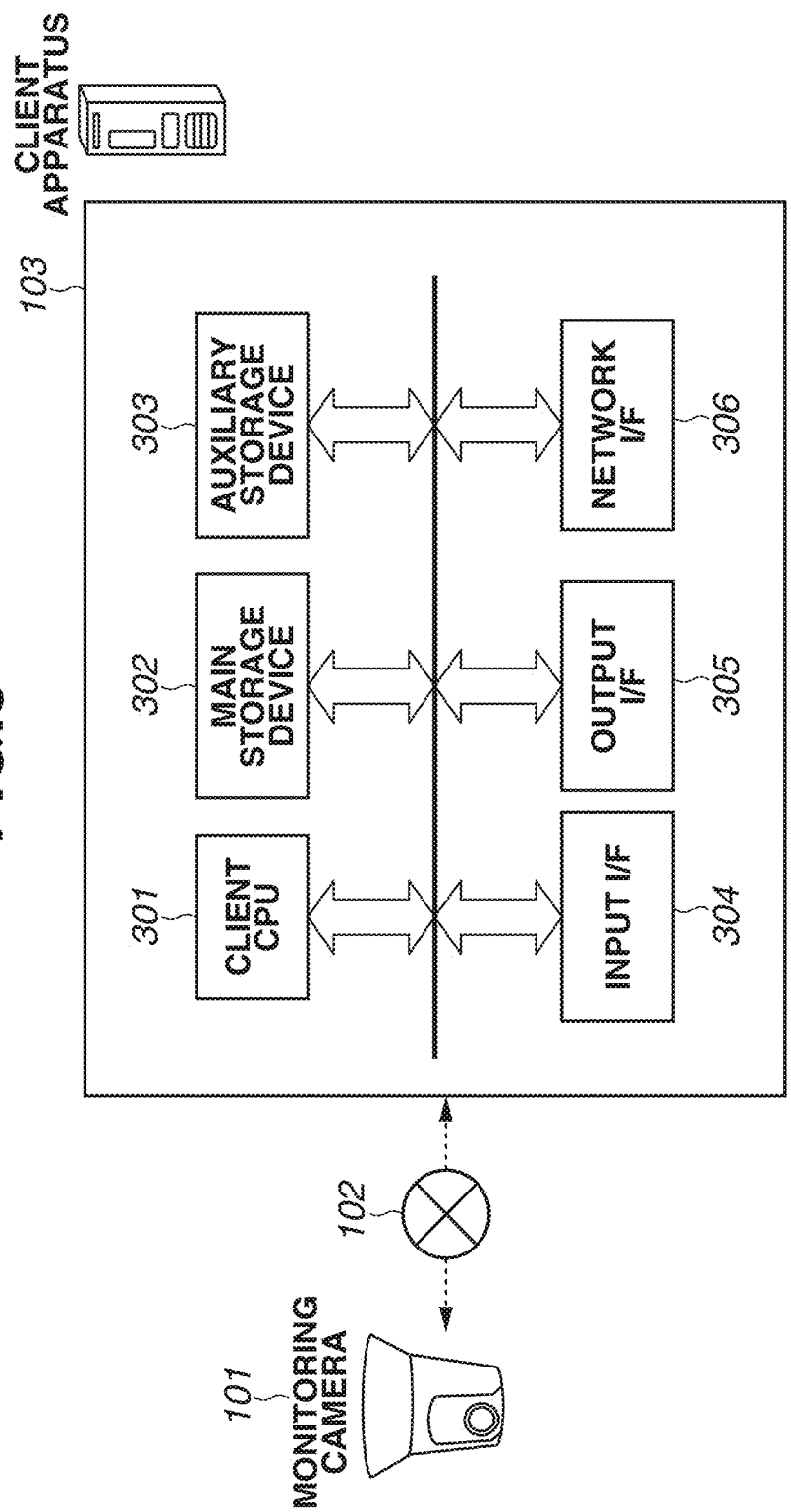
FIG. 3 is a block diagram illustrating an example of an internal configuration of a client apparatus that is an information processing apparatus according to the first exemplary embodiment.

FIG. 3 is a block diagram illustrating an example of an internal configuration of the client apparatus 103 that is an information processing apparatus according to the present exemplary embodiment. The client apparatus 103 includes a client CPU 301, a main storage device 302, an auxiliary storage device 303, an input I/F 304, an output I/F 305, and a network I/F 306. The foregoing components are communicably connected to one another via a system bus.

The client CPU 301 comprehensively controls operations of the client apparatus 103. The client CPU 301 may be configured to comprehensively control the monitoring camera 101 via the network 102. The main storage device 302 is, for example, a RAM and functions as a temporary data storage area of the client CPU 301. The auxiliary storage device 303 is, for example, a hard disk drive (HDD), a ROM, or a solid-state drive (SSD) and stores various programs and various types of setting data. The input I/F 304 is used to receive an input from the input apparatus 104. The output I/F 305 is used to output information to the display apparatus 105. The network I/F 306 is used to communicate with an external apparatus such as the monitoring camera 101 via the network 102.

Figure 4:
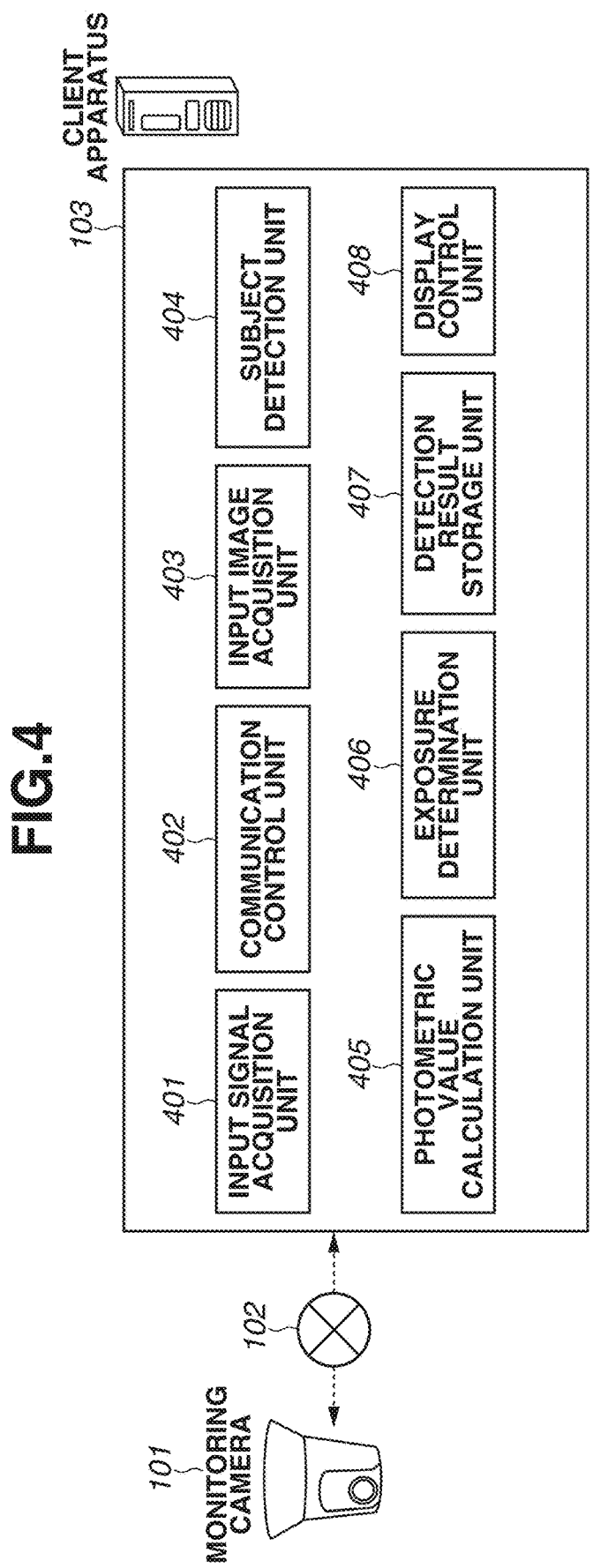
FIG. 4 is a diagram illustrating an example of a functional configuration of the client apparatus according to the first exemplary embodiment.

The client CPU 301 performs processing based on a program stored in the auxiliary storage device 303, thereby implementing functions and processing of the client apparatus 103 illustrated in FIG. 4. Details thereof will be described below.

The input apparatus 104 illustrated in FIG. 1 includes, for example, a mouse and a keyboard. The display apparatus 105 illustrated in FIG. 1 is, for example, a monitor and displays an image output from the client apparatus 103. While the imaging control system according to the present exemplary embodiment includes the client apparatus 103, the input apparatus 104, and the display apparatus 105 as separate apparatuses, the configuration is not limited thereto. For example, the client apparatus 103 and the display apparatus 105 may be integrated together, or the input apparatus 104 and the display apparatus 105 may be integrated together. Furthermore, the client apparatus 103, the input apparatus 104, and the display apparatus 105 may be integrated together.

FIG. 4 is a diagram illustrating an example of a functional configuration of the client apparatus 103 according to the present exemplary embodiment. Components illustrated in FIG. 4 are functions of a configuration that can be implemented by the client CPU 301 and are equivalent to the client CPU 301. More specifically, the client CPU 301 of the client apparatus 103 includes an input signal acquisition unit 401, a communication control unit 402, an input image acquisition unit 403, a subject detection unit 404, a photometric value calculation unit 405, an exposure determination unit 406, a detection result storage unit 407, and a display control unit 408. Alternatively, the client apparatus 103 may include the components illustrated in FIG. 4, separately from the client CPU 301.

The input signal acquisition unit 401 is an input unit that receives a user's input via the input apparatus 104.

The communication control unit 402 performs control for receiving, via the network 102, images transmitted from the monitoring camera 101. The communication control unit 402 also performs control for transmitting control instructions to the monitoring camera 101 via the network 102.

The input image acquisition unit 403 acquires an image captured by the monitoring camera 101 via the communication control unit 402, as a target image for subject detection processing. Details of the detection processing will be described below.

The subject detection unit 404 performs various types of detection, including face region detection (face detection) and human body region detection (human body detection), on the image acquired by the input image acquisition unit 403. While the subject detection unit 404 according to the present exemplary embodiment is configured to select a desired method between the face detection and the human body detection, the configuration is not limited thereto. For example, a configuration capable of detecting a feature region of a portion of a person, such as an upper body of the person or a partial region of the face such as an eye, a pupil, a nose, or a mouth, may be selectable. Furthermore, while in the present exemplary embodiment, a person is described as a subject serving as a detection target, a configuration capable of detecting a specific region of a predetermined subject other than a person may be employed. For example, a configuration capable of detecting a predetermined subject, such as an animal face or an automobile, that is preset using the client apparatus 103 may be employed.

The photometric value calculation unit 405 calculates a photometric value in a current frame based on a current frame detection result acquired from the subject detection unit 404 and a previous frame detection result acquired from the detection result storage unit 407.

The exposure determination unit 406 determines an exposure value in subject image capturing for acquiring an image, based on the photometric value calculated by the photometric value calculation unit 405 and a target value. The exposure value determined by the exposure determination unit 406 includes an exposure value based on a program chart for exposure control that is recorded in advance in the client apparatus 103, and an exposure correction value for correcting the exposure value. Information about the exposure value determined by the exposure determination unit 406 is transmitted to the monitoring camera 101 by the communication control unit 402, so that exposure control in the monitoring camera 101 is performed. Detailed processing regarding operations of the subject detection unit 404, the photometric value calculation unit 405, and the exposure determination unit 406 will be described below with reference to a flowchart illustrated in FIG. 5. The detection result storage unit 407 is an exposure storage unit that stores the exposure value determined by the exposure determination unit 406. The display control unit 408 outputs an image reflecting the exposure value determined by the exposure determination unit 406, to the display apparatus 105 based on an instruction from the client CPU 301.

<Subject Detection Processing and Exposure Determination Processing>

Subject detection processing and exposure determination processing according to the present exemplary embodiment will be described next with reference to the flowchart illustrated in FIG. 5. FIG. 5 is the flowchart illustrating an example of the subject detection processing and an example of the exposure determination processing according to the present exemplary embodiment. It is assumed that the apparatuses in the imaging system illustrated in FIG. 1 are turned on and a connection (communication) is established between the monitoring camera 101 and the client apparatus 103. In this state, it is also assumed that subject image capturing, image data transmission, and image display on the display apparatus 105 are repeated in the imaging system at predetermined update intervals. The flowchart illustrated in FIG. 5 is started by the client CPU 301 of the client apparatus 103 in response to input of an image acquired by subject image capturing from the monitoring camera 101 via the network 102.

First, in step S501, the subject detection unit 404 performs detection of a subject's face on the image acquired by the input image acquisition unit 403. As a method for detecting the face, a pattern matching method using a pattern (classifier) generated using statistical learning or a method other than the pattern matching method such as a subject detection method using a luminance gradient in a local region may be used. In other words, the detection method is not specifically limited, and various methods can be employed such as a detection method based on machine learning and a detection method based on distance information.

Next, in step S502, whether a face is detected in the face detection performed in step S501 is determined. In a case where a face is not detected (NO in step S502), the processing proceeds to step S508. On the other hand, in a case where at least one face is detected (YES in step S502), the processing proceeds to step S503.

In step S503, the photometric value calculation unit 405 calculates an average luminance value Iface of a face region of the face determined to have been detected in step S502, based on the detection result acquired from the subject detection unit 404. More specifically, the photometric value calculation unit 405 applies information about the number of detected faces, the position of a detected face, and the size of a detected face to the following formula (1) based on the detection result acquired from the subject detection unit 404.

$$\overline{I}_{face}(t) = \frac{1}{f}\sum_{s=1}^{f}\left\{\frac{1}{k_s \times l_s}\sum_{i=-k_s/2}^{k_s/2}\sum_{j=-l_s/2}^{l_s/2} I(v_s + i, h_s + j, t)\right\} \quad (1)$$

In the formula (1), I(x, y) represents a luminance value of a two-dimensional coordinate position (x, y) in a horizontal direction (x-axis direction) and a vertical direction (y-axis direction) in the image. f represents the number of detected faces. (v, h) represents the center coordinates of a region where a subject is detected. k represents the size of a region where a subject is detected in the horizontal direction. l represents the size of a region where a subject is detected in the vertical direction. t represents the time of a frame in which a subject is detected. In step S510, as in step S503, information about the number of detected human bodies, the position of a detected human body, and the size of a detected human body is applied to the following formula (2) to calculate an average luminance value of a human body region.

$$\overline{I}_{body}(t) = \frac{1}{g}\sum_{s=1}^{g}\left\{\frac{1}{k_s \times l_s}\sum_{i=-k_s/2}^{k_s/2}\sum_{j=-l_s/2}^{l_s/2} I(v_s + i, h_s + j, t)\right\} \quad (2)$$

In the formula (2), g represents the number of detected human bodies, and the other symbols are similar to those in the formula (1). Next, in step S504, the photometric value calculation unit 405 calculates a photometric value E(t) in the current frame (at the time t) based on the average luminance value Iface of the face region calculated in step S503 and a previous frame detection result. For example, the photometric value E(t) is obtained by using the following formulas (3) and (4) to calculate a weighted average of the average luminance value Iface of the face region in the current frame and average luminance values of a face region and a human body region in a previous frame immediately preceding the current frame.

$$E(t) = \sum_{i=t-n}^{t}\begin{cases} \alpha_i \times \overline{I}_{face}(i) & \text{if face is detected at time } i \\ \beta_i \times \overline{I}_{body}(i) & \text{if human body is detected at time } i \\ 0 & \text{if no subject is detected at time } i \end{cases} \quad (3)$$

$$\sum_{i=t-n}^{t}\alpha_i + \sum_{i=t-n}^{t}\beta_i = 1.0 \quad (4)$$

In the formulas (3) and (4), n represents the number of previous frames for use in calculating the weighted average. In a proposed method, the number of previous frames n is set to 1 or more. For example, in a case where the number of previous frames n is 10, a weighted average of average luminance values in the current frame and ten frames immediately preceding the current frame is calculated. Furthermore, α and β represent weight parameters for the average luminance value of a face region and the average luminance value of a human body region, respectively, which are used in calculating the weighted average. Values of the weight parameters α and β can be changed depending on the environment in which the subject is detected, the application purpose of subsequent authentication processing, and the accuracy of detection processing by the subject detection unit 404. A specific method of setting the parameters α and β and an effect of the parameters α and β will be described below with reference to FIGS. 6A to 7D. The photometric value calculation method based on the current frame detection result and the previous frame detection result is not limited to the method using the formulas (3) and (4). For example, a calculation method using a statistical value that considers an influence of a plurality of frames in a temporal direction, such as arithmetic averaging, harmonic averaging, or geometric averaging may be employed.

Next, in step S505, a difference value ΔDiff between a target value Itarget for the subject region and the photometric value E(t) calculated in step S504 is calculated as expressed by the following formula (5).

$$\Delta\text{Diff} = I_{target} - E(t) \quad (5)$$

In the formula (5), the target value Itarget for the subject region may be preset by the user or may be a fixed value preset on hardware.

Next, in step S506, an exposure correction amount EVcorrection is determined based on the difference value ΔDiff calculated in step S505, a predetermined threshold value Th, and a current exposure value EVcurrent. For example, the exposure correction amount EVcorrection is determined as expressed by the following formula (6).

$$EV_{correction} = \begin{cases} EV_{current} - \gamma & \text{if } \Delta Diff < -Th \\ EV_{current} & \text{if } -Th \leq \Delta Diff \leq Th \\ EV_{current} + \gamma & \text{if } Th < \Delta Diff \end{cases} \quad (6)$$

In the formula (6), a parameter γ represents an exposure correction value that influences a correction for shifting the current exposure value EVcurrent to an underexposure side or an overexposure side in a case where the difference ΔDiff calculated in step S505 does not meet the predetermined threshold value Th. For example, as indicated by the last branch of the formula (6), in a case where the difference ΔDiff between the photometric value E(t) and the target value Itarget is greater than the threshold value Th (Th<ΔDiff), it is determined that the average luminance of the subject region in this state is on the underexposure side. Then, the current exposure value EVcurrent is corrected to be increased (by +γ), so that the brightness of the subject region is controlled to be closer to the target value Itarget. Thus, in order to perform exposure correction stably in the temporal direction, it is important that the difference value ΔDiff calculated using the formula (5) change gradually in the temporal direction.

Figure 6A:
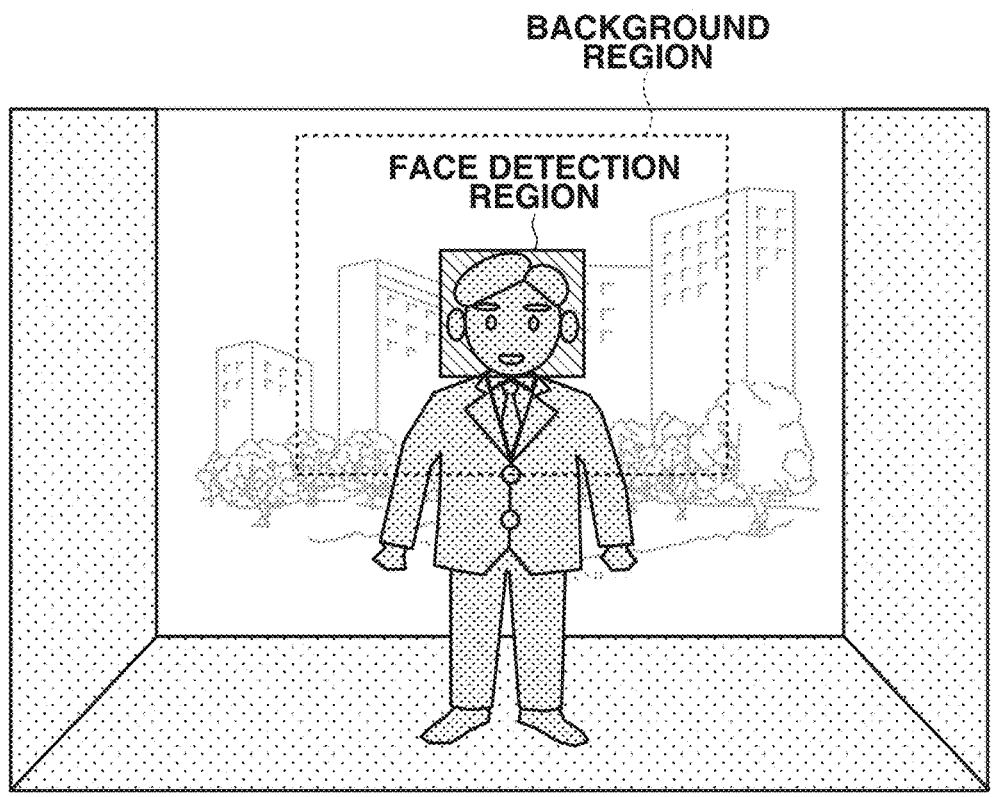
FIGS. 6A and 6B are diagrams each illustrating a relationship between a subject detection region and a background region according to the first exemplary embodiment.
Figure 6B:
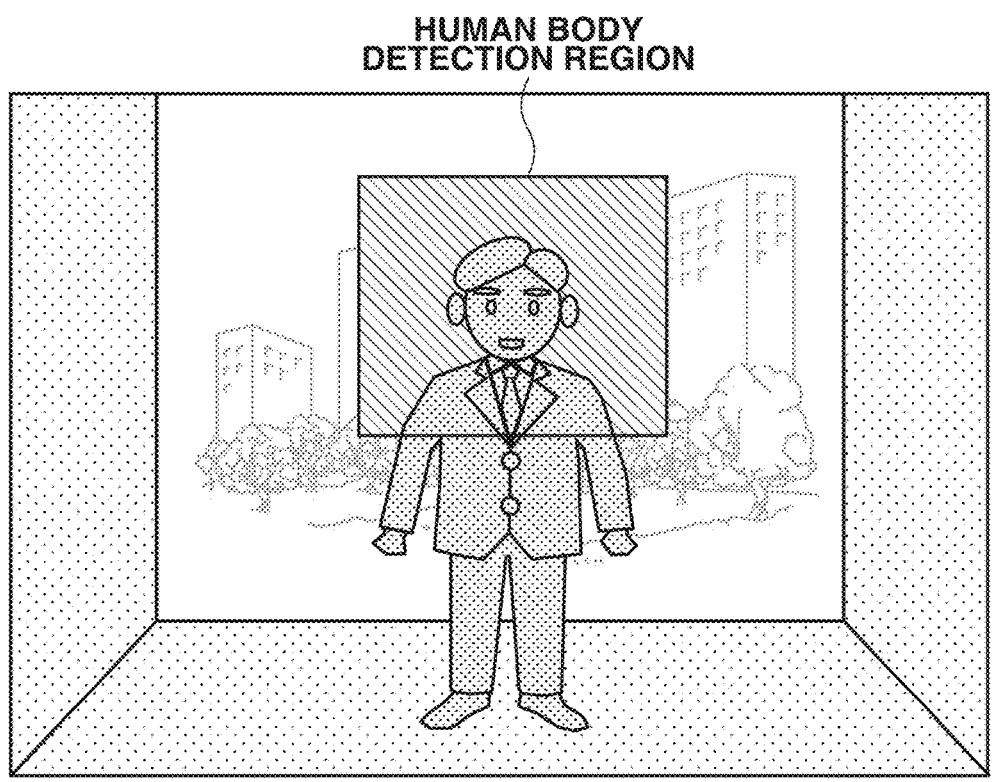
Figure 7A:
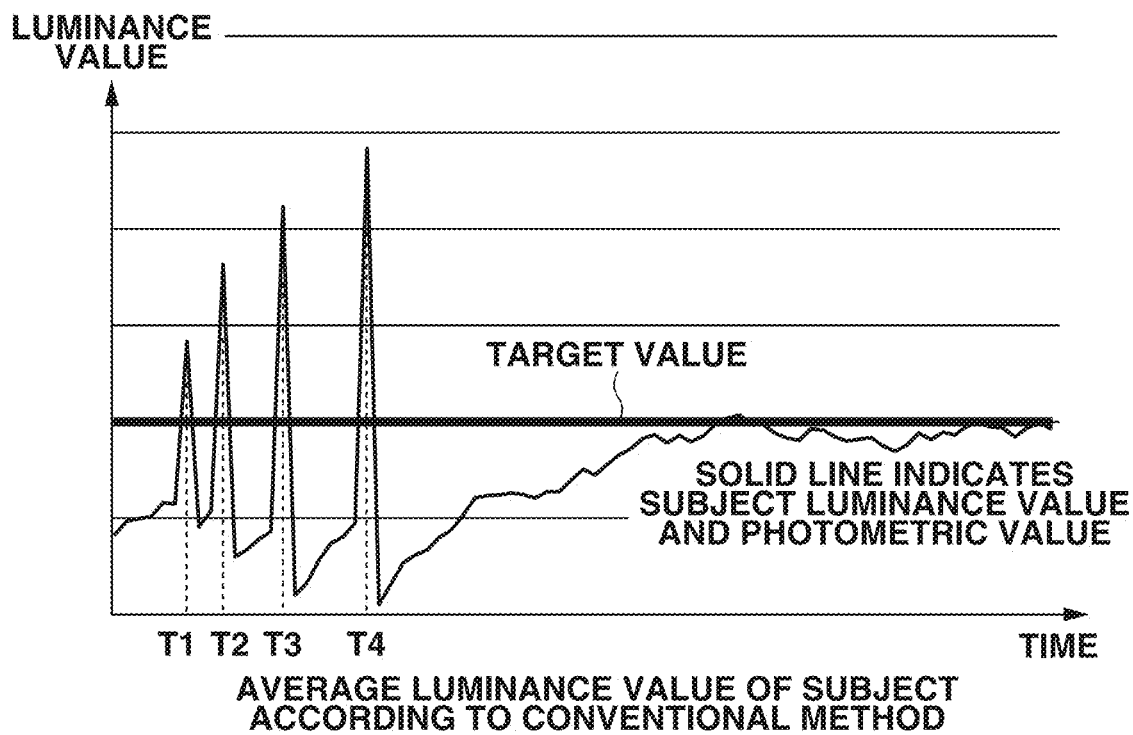
FIGS. 7A to 7D are diagrams illustrating a relationship between an average luminance value of a subject and a difference value according to the first exemplary embodiment.
Figure 7B:
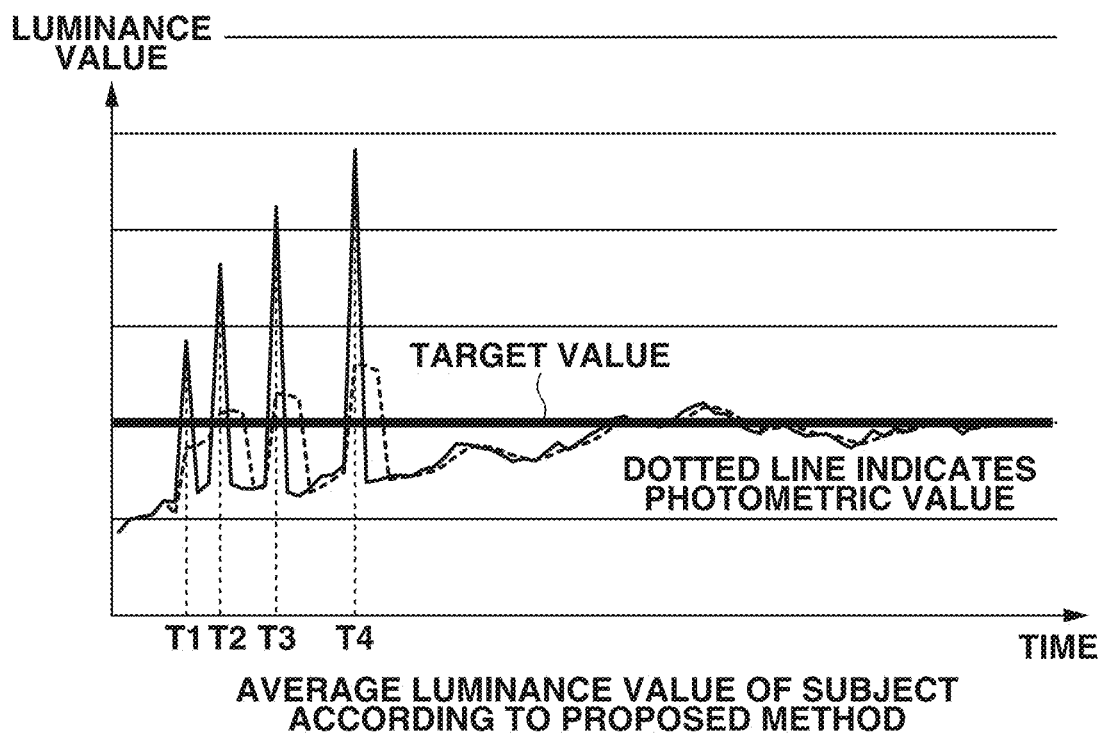
Figure 7C:
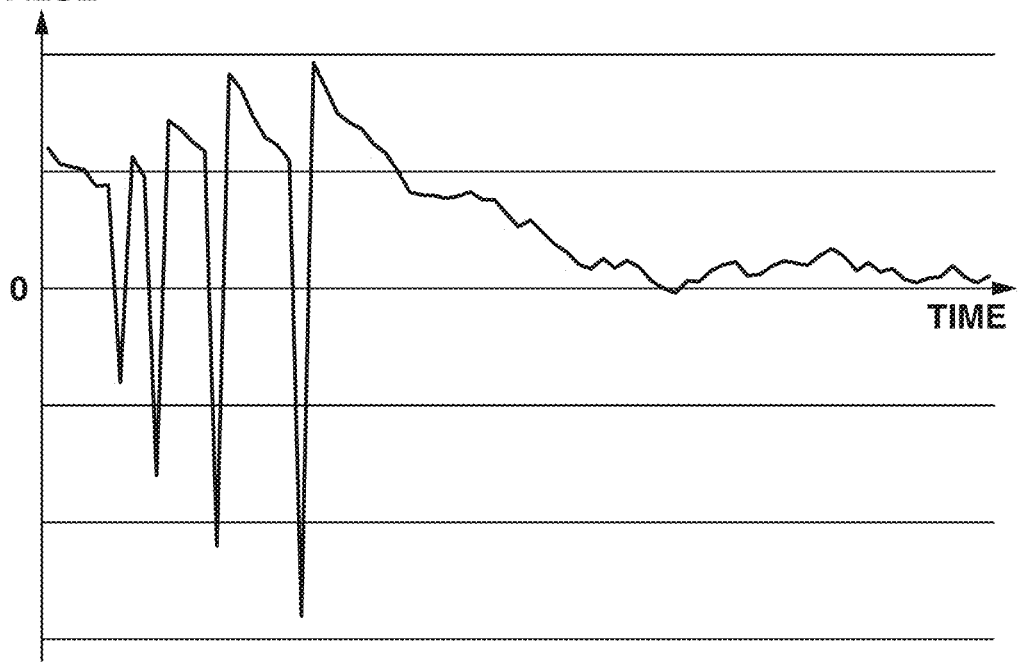
Figure 7D:
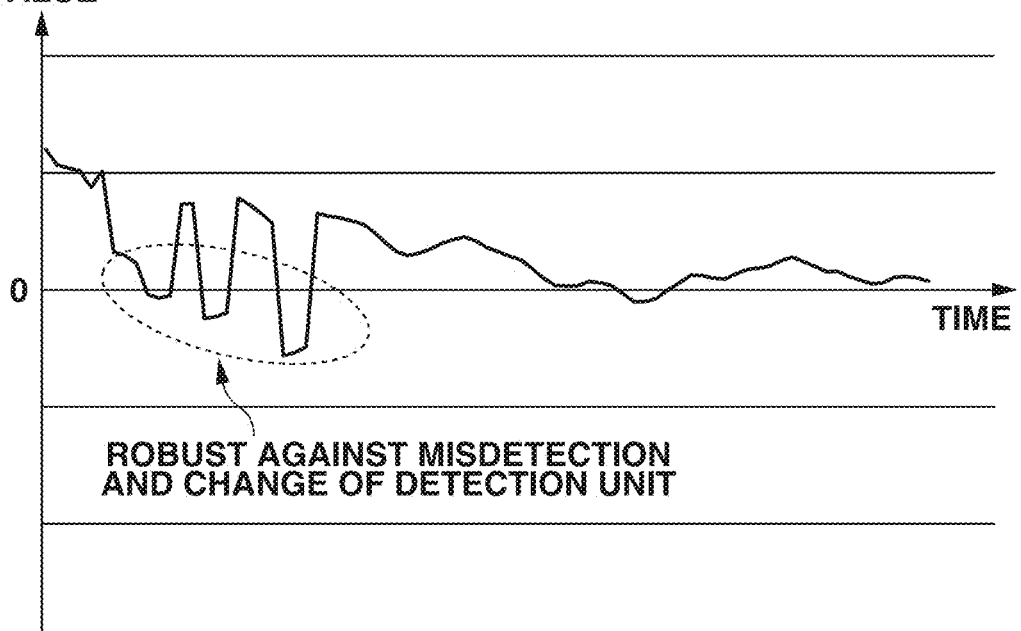

A specific method of setting the parameters α and β in the formulas (3) and (4) and an effect thereof will be described next. In general, as illustrated in FIGS. 6A and 6B, a human body region detection result erroneously includes many pixels that are supposed to be determined as a background region (as indicated by a hatched region in FIG. 6B), compared to a face region detection result. For example, in a case where a subject is detected at an entrance or an exit of a building or a stadium as illustrated in FIGS. 6A and 6B, the average luminance value of the human body region may be calculated to be greater than an expected value due to the pixels of the background region that are erroneously included. FIGS. 7A and 7B each illustrate how the average luminance value of a subject changes with the passage of time in a case where the subject is detected in a backlight scene as illustrated in FIGS. 6A and 6B. FIGS. 7C and 7D each illustrate how the difference value ΔDiff changes with the passage of time in a case where a subject is detected in a backlight scene as illustrated in FIGS. 6A and 6B. As time passes, face detection is performed on many frames and exposure correction is performed to increase the current exposure value EVcurrent toward the target value Itarget. However, in a case where, for example, the orientation of the face changes or the face region is shadowed, there are moments when human body detection is performed instead of face detection, and the average luminance value of the subject temporarily becomes high as indicated by times T1, T2, T3, and T4 in FIGS. 7A and 7B.

In this case, with a conventional method not considering a previous frame detection result, the photometric value E(t) temporarily becomes greater than the target value Itarget, so that it is difficult to calculate the exposure correction amount EVcorrection stably with respect to the temporal direction. As used herein, the term "conventional method" refers to a method in which the number of previous frames n=0 is substituted into the formulas (3) and (4). Consequently, there are likely to be moments when the subject region suddenly becomes bright or dark depending on the timing. On the contrary, with a proposed method according to the present exemplary embodiment, the photometric value E(t) is calculated in consideration of results of subject detection on a plurality of previous frames so that the photometric value E(t) is smooth in the temporal direction (as indicated by a dotted line illustrated in FIG. 7B).

As a result, exposure fluctuations in the temporal direction are stabilized. As used herein, the term "proposed method" refers to a method in which the number of previous frames n=1 or greater is substituted into the formulas (3) and (4). Furthermore, as described above, the average luminance value of a human body region is in general likely to be affected by a background region, compared to the average luminance value of a face region. Taking this into consideration, the weight parameters α and β in the formula (4) are set to satisfy the relation of α>β. This achieves exposure control that places importance on more accurate detection processing. The relation between the weight parameters α and β is not limited to the relation that places importance on the accuracy of detection processing. For example, in a case where the number of persons is counted in subsequent authentication processing, the weight parameters α and β may be set to satisfy the relation of α<β that places importance on human body detection processing. In addition, in a case where the accuracy of human body detection processing and the accuracy of face detection processing are equivalent and comparable, the weight parameters α and β may be set to satisfy the relation of α=β. Furthermore, while exposure fluctuations that occur depending on the type of detection processing are described as an issue with reference to FIGS. 7A to 7D, the issue to which the proposed method is applicable is not limited thereto. The proposed method is also applicable to an issue caused by, for example, erroneous detection, thereby achieving stable exposure.

Returning to FIG. 5, in step S507, the average luminance value calculated in step S503 or S510 and information about the subject detection method are stored in the detection result storage unit 407. The above is the description of the processing that is performed according to the present exemplary embodiment in a case where at least one face region is detected.

Next, processing performed according to the present exemplary embodiment in a case where a face region is not detected will be described next. In a case where a face region is not detected in step S502 (NO in step S502), then in step S508, the subject detection unit 404 performs human body detection of the subject on the image acquired by the input image acquisition unit 403.

Next, in step S509, whether a human body region is detected from the image is determined based on a result of the human body detection performed in step S508. In a case where at least one human body region is detected (YES in step S509), the processing proceeds to step S510. On the other hand, in a case where a human body region is not detected (NO in step S509), the processing proceeds to step S514. In a case where the processing proceeds to step S514 (i.e., a case where neither a face region nor a human body region is detected), exposure correction based on a subject detection result is not performed. The processing in steps S510 to S513 is performed using arithmetic formulas that are substantially the same as those used in steps S503 to S506 described above except that the average luminance value of the human body region is calculated to determine the exposure, and thus detailed description of steps S510 to S513 will be omitted.

As described above, the imaging system according to the present exemplary embodiment calculates the photometric value E(t) based on the result(s) of subject detection on the previous frame(s) in addition to the result of subject detection on the current frame, and sets an optimum exposure for the subject in the image. Thus, the imaging system according to the present exemplary embodiment reduces exposure fluctuations caused by change of detection processing, and stably performs optimum exposure control on the subject. Furthermore, since a weight is variably controlled for each detection processing, exposure control that is not affected by processing with low detection accuracy and is robust against randomly-occurring erroneous detection is achieved.

A second exemplary embodiment will be described next. As a modified example of the above-described exemplary embodiment, a case where the photometric value E(t) is calculated based on a detection score calculated by a detection unit will be described with reference to FIGS. 8A to 8E and formula (7). As used herein, the term "detection score" refers to an evaluation value that indicates a degree of reliability of a result of detection by the detection unit. More specifically, the greater the value of the detection score, the higher the possibility of a detection target being present in a set detection region. The smaller the value of the detection score, the higher the possibility of a detection target being not present in a set detection region (i.e., the possibility of erroneous detection). While the detection score according to the present modified example is described using values that are normalized in a value range between a minimum value of 0 and a maximum value of 100 for convenience, the detection score is not limited thereto.

Figure 8A:
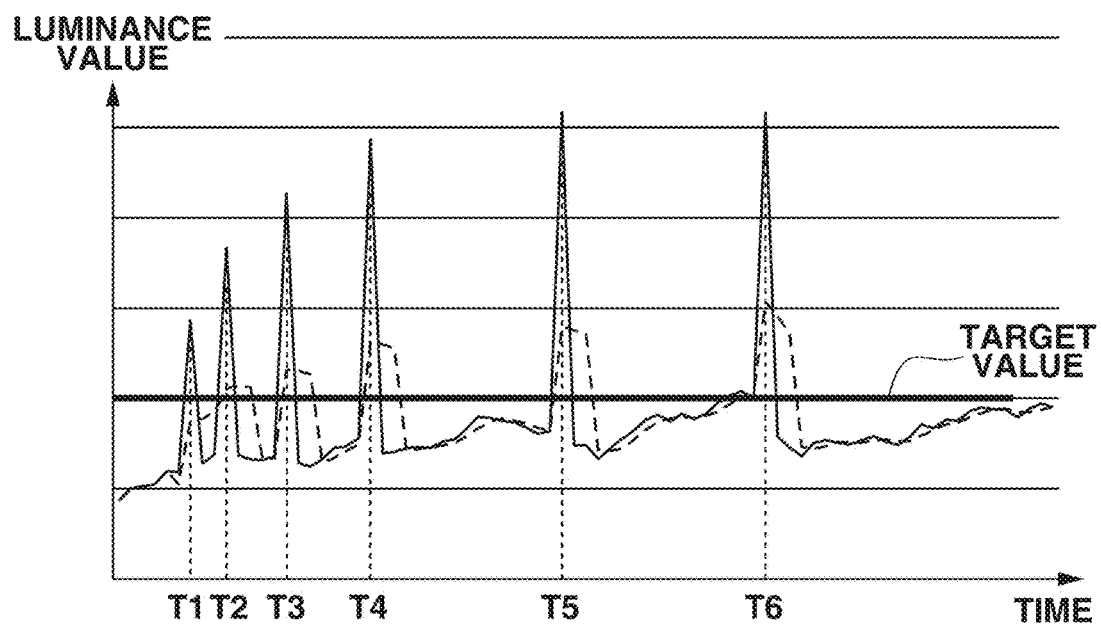
Figure 8B:
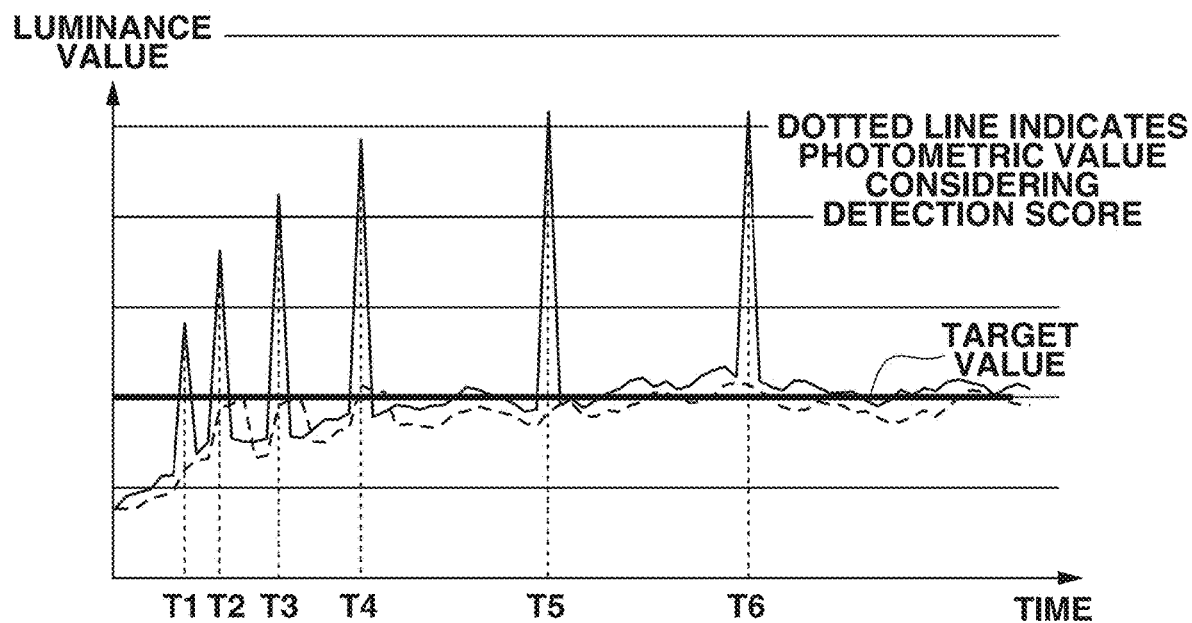

FIGS. 8A and 8B each illustrate how the average luminance value of a subject changes with the passage of time, FIG. 8C illustrates the detection scores, and FIGS. 8D and 8E each illustrate how the difference value ΔDiff changes with the passage of time. As time passes, subject detection is performed on many frames, and erroneous detection with a low detection score occurs at random timings as indicated by times T1, T2, T3, T4, T5, and T6 in FIGS. 8A and 8B. Erroneous detection often refers to a region where a subject is not present, so that an average luminance value calculated based on the erroneous detection is significantly different from the average luminance value of the subject. Accordingly, in a case where erroneous detection occurs frequently, exposure fluctuations occur with the conventional method, and even the above-described proposed method using weighted averaging is affected to some extent (refer to FIG. 8A). Thus, in the present modified example, for example, the photometric value E(t) is calculated using the detection score as expressed by the following formula (7).

$$E(t) = \frac{\sum_{i=t-n}^{t} \text{Score}(i) \times \overline{I}_{Face/body}(i)}{\sum_{i=t-n}^{t} \text{Score}(i)} \quad (7)$$

In the formula (7), Score(t) represents a detection score value at the time t. A dotted line in a graph illustrated in FIG. 8B indicates an example of the photometric value E(t) calculated in a case where the formula (7) is applied. Considering the detection scores enables the photometric value E(t) to be calculated without being affected by the average luminance value in a frame on which erroneous detection is probably performed. As a result, as apparent from a comparison of FIGS. 8A and 8B, the proposed method considering the detection scores can image the subject for a long time at brightness closer to the target value, compared to the proposed method not considering the detection scores. Furthermore, the number of previous frames n for use in weighted averaging can be changed depending on the value of the detection score. For example, in a case where the value of the detection score has been low for a predetermined period of time, the value of the number of previous frames n for use in weighted averaging is increased to reduce an influence on the photometric value E(t). On the other hand, in a case where the value of the detection score has been continuously high, the value of the number of previous frames n is decreased to calculate the photometric value E(t) with high accuracy while suppressing the amount of calculation. The parameter Score(t) used in the formula (7) is not limited to the detection score and can be substituted by information about detection accuracy, such as the amount of noise contained in a video image, a value of Q that determines the quality of a video image, and camera setting conditions.

With the foregoing configuration, optimum exposure control is stably performed on a main subject that the user intends to image.

While a lens-integrated imaging apparatus in which the imaging optical system 201 is integrated with the monitoring camera 101 has been described as an example of an imaging apparatus according to the above-described exemplary embodiments, the imaging apparatus according to the exemplary embodiments is not limited thereto. For example, a lens exchangeable imaging apparatus in which the monitoring camera 101 and a lens unit including the imaging optical system 201 are separately provided may be employed.

Furthermore, a computer program (software) for implementing the functions according to the above-described exemplary embodiments to perform the control according to an exemplary embodiment of the present disclosure partially or entirely may be supplied to an imaging apparatus or an information processing apparatus via a network or various storage mediums. Then, a computer (or a CPU, an MPU, or the like) of the imaging apparatus or the information processing apparatus may read the program and execute the read program. In this case, the program and the storage medium that stores the program constitute the exemplary embodiments of the present disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-149010, filed Sep. 4, 2020, which is hereby incorporated by reference herein in its entirety.

What is claimed is:

1. An apparatus comprising:
at least one processor; and
a memory coupled to the at least one processor, the memory having instructions that, when executed by the processor, perform operations as:
an acquisition unit configured to acquire an image;
a first detection unit configured to detect a first region corresponding to a first feature from the image;
a second detection unit configured to detect a second region corresponding to a second feature from the image;
a measurement unit configured to perform photometric measurement on the first region and the second region;
a determination unit configured to determine an exposure based on a weighted average of first photometric values of the first region that are acquired by the measurement unit in a current image and at least one previous image and second photometric values of the second region that are acquired by the measurement unit in the current image and at least one previous image; and
an output unit configured to output information about the exposure.

2. The apparatus according to claim 1, wherein a weight for at least one of the first photometric values is greater than a weight for at least one of the second photometric values.

3. The apparatus according to claim 1, wherein an area of the first region is smaller than an area of the second region.

4. The apparatus according to claim 1, wherein the determination unit calculates the weighted average of the first photometric values and the second photometric values based on a first score indicating a degree of reliability of the detected first region and a second score indicating a degree of reliability of the detected second region.

5. The apparatus according to claim 1, wherein the first detection unit detects a face region as the first region.

6. The apparatus according to claim 1, wherein the second detection unit detects a human body region as the second region.

7. The apparatus according to claim 1, wherein weighting coefficients for the first photometric values and the second photometric values are determined, based on results of the detection of the first detection unit and second detection unit for each image.

8. The apparatus according to claim 1, wherein, in a case where the first detection unit detects the first region, a first weighting coefficient for a first photometric value of the first region that is acquired by the measurement unit is determined, and
wherein, in a case where the second detection unit detects the second region, second weighting coefficient for the second photometric value of the second region that is acquired by the measurement unit is determined.

9. A method comprising:
acquiring an image;
detecting a first region corresponding to a first feature from the image;
detecting a second region corresponding to a second feature from the image;
performing photometric measurement on the first region and the second region;
determining an exposure based on a weighted average of first photometric values of the first region that are acquired in the photometric measurement in a current image and at least one previous image and second photometric values of the second region that are acquired in the photometric measurement in the current image and at least one previous image; and
outputting information about the exposure.

10. The method according to claim 9, wherein a weight for at least one of the first photometric values is greater than a weight for at least one of the second photometric values.

11. The method according to claim 9, wherein an area of the first region is smaller than an area of the second region.

12. The method according to claim 9, wherein the determining calculates the weighted average of the first photometric values and the second photometric values based on a first score indicating a degree of reliability of the first region and a second score indicating a degree of reliability of the second region.

13. The method according to claim 9, wherein a face region is detected as the first region.

14. The method according to claim 9, wherein a human body region is detected as the second region.

15. A non-transitory computer-readable storage medium storing a program for causing a computer to execute a method comprising:
acquiring an image;
detecting a first region corresponding to a first feature from the image;
detecting a second region corresponding to a second feature from the image;
performing photometric measurement on the first region and the second region;
determining an exposure based on a weighted average of first photometric values of the first region that are acquired in the photometric measurement in a current image and at least one previous image and second photometric values of the second region that are acquired in the photometric measurement in the current image and at least one previous image; and
outputting information about the exposure.

16. The non-transitory computer-readable storage medium according to claim 15, wherein a weight for at least one of the first photometric values is greater than a weight for at least one of the second photometric values.

17. The non-transitory computer-readable storage medium according to claim 15, wherein an area of the first region is smaller than an area of the second region.

18. The non-transitory computer-readable storage medium according to claim 15, wherein the determining calculates the weighted average of the first photometric values and the second photometric values based on a first score indicating a degree of reliability of the first region and a second score indicating a degree of reliability of the second region.

19. The non-transitory computer-readable storage medium according to claim 15, wherein a face region is detected as the first region.

20. The non-transitory computer-readable storage medium according to claim 15, wherein a human body region is detected as the second region.

* * * * *